June 3, 1930.  E. C. CARTER  1,761,775

SPEED CONTROLLER

Filed Dec. 17, 1927

Inventor
Elmer C. Carter
By
His Attorneys

Patented June 3, 1930

1,761,775

UNITED STATES PATENT OFFICE

ELMER C. CARTER, OF OAKWOOD VILLAGE, DAYTON, OHIO, ASSIGNOR TO THE NATIONAL CASH REGISTER COMPANY, OF DAYTON, OHIO, A CORPORATION OF MARYLAND

SPEED CONTROLLER

Application filed December 17, 1927. Serial No. 240,758.

This invention relates to speed governors for motive power generating devices.

The mechanism is shown applied to an electric motor but, it can readily be adapted for use with other motive power supplying devices using various sources of energy, such for instance, as water, air steam, etc.

An object of the invention is to control the flow of motive power by controlling the supply of energy to the power generator.

The specific object of the invention is to provide a novel device whereby the excessive speed of an electric motor whether operating idly or under load, will operate to open the electric circuit for said motor.

Another object of the invention is to provide a motor speed control device not affected by the end play of the armature shaft of the motor, this end play being useful in permitting the armature to find its electrical center, in which center the motor attains its maximum efficiency.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

The invention as illustrated herein is shown applied to an electric motor of a well known type, such as is commonly used on cash registers and other accounting or calculating devices.

It is to be understood, however, that by making slight changes in the proportions of the several parts comprising the device, it can be adapted for use on motors of various sizes and powers, and also may be readily adapted to other motive power motors. Therefore, it is not intended to limit the invention to the particular design disclosed in the instant application or to limit its usage to electric motors.

The device includes generally a disc fixed upon the rotating armature shaft of an electric motor and rotating within a flanged shell supported to rock on the motor frame. Weighted arms pivoted to the disc carry shoes, the free ends of which are brought into contact with the flange of the shell through centrifugal action when the shaft reaches an excessive speed. The frictional engagement of the shoes against the inner periphery of the flange is sufficient to turn the shell slightly, which, by means of a link pivoted on said shell, raises an arm to open a switch and interrupt the electric circuit. The speed of the motor is then retarded to a point where a spring overcomes the centrifugal force and withdraws the weighted arms to disengage their shoes from the flange of the shell, whereupon another spring restores the shell to its former position, thereby closing the electric circuit to energize the motor again.

As is well known, to permit an electric motor to operate at its maximum efficiency, it is necessary to provide end play for the armature shaft, so that the armature can find its electrical center. When motors are manufactured in large quantities like those disclosed herein, this end play is particularly useful since the windings all vary, to more or less degree, and therefore, it is necessary to provide a speed control not affected by this end play. This has been accomplished by making the flanged wall of the friction shell wide enough to provide an effective driving connection within the limits of the axial movement of the armature shaft. Upon this shaft the friction shoes, which cooperate with the inner wall of the flange, are mounted. Thus, the friction shoes are permitted to shift axially when the motor is started, but they are always in effective relation with the friction surface of the flange of the friction shell.

Figure 1:
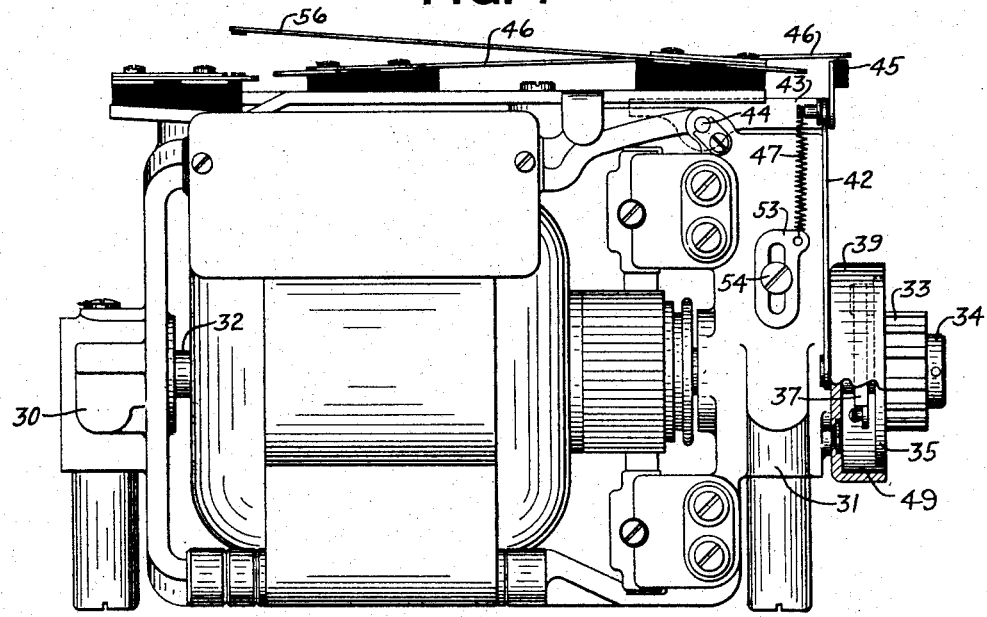
Fig. 1 is a view in front elevation of an electric motor of conventional design with one form of my improved speed governing device applied thereto.

In Figure 1, there is shown an electric motor of conventional design, such as is well adapted for use on cash registers and other small power-driven machines.

It is not believed necessary to include in this application a detailed description of the motor. If such description is desired, reference may be had to Letters Patent of the United States, No. 1,144,418, issued to C. F. Kettering and W. A. Chryst on June 29, 1915, which patent discloses a similar motor.

It will be noted here, however, that this motor is of the series type, the speed of which varies with the load. When operating under a light load or no load, the series motor accelerates to a very high speed, and under a heavy load the speed thereof is low.

When a new cash register or calculating machine is first placed in use, it is usually stiff, due to the close fitting moving parts, and therefore, more power is required to operate it than when the bearing parts are well worn in.

If a motor is design to properly operate the machine when it leaves the factory, the same motor later, after the machine is worn in, will operate the machine at too great a speed.

In many machines, particularly in cash registers and accounting machines, but in others as well, the load during an operation varies as the different elements of the machine are operated. If the motor is designed to deliver the requisite power for the heaviest load, it operates at too great a speed on the lighter portion of the load.

Also, as is well known, the voltage on electric current supply lines often fluctuates either increasing above normal under a light overall load, or falling below normal due to increased load. This fluctuation causes a corresponding fluctuation in the speed of the motor.

Several devices have been used to control the speed of such motors, including mechanical braking means and resistances shunted across the armature or the field of the motor. The mechanical brake merely places additional load on the motor, and in case of the resistance shunted across the armature or field winding, such resistances reduce the effective current applied to the motor. Both of these devices reduce the speed of the motor, doing so, however, by the extravagant expedient of wasting energy. The device embodied in the present invention accomplishes the same results by automatically interrupting the energy supply when the speed of the motor exceeds a certain number of revolutions, and when the speed falls to normal, the device automatically closes the circuit, thus conserving the energy.

A description of the speed control device and the manner in which it operates will now be given.

The motor includes the usual frames 30 and 31, (Fig. 1), in which are mounted the field coils and the bearings for the armature shaft 32. A gear 33, the hub 34 of which is pinned to the shaft 32, transmits the power developed in the motor to the machine which it is desired to operate by said motor, through suitable mechanism not herein shown, reference being had to the above mentioned Kettering and Chryst patent for a familiar example of such mechanism.

Figure 3:
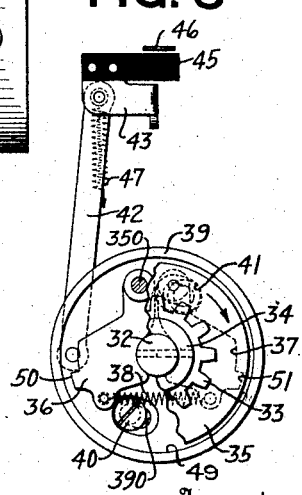
Fig. 3 is a fragmentary view in right elevation, partly broken away for clearness, of the speed governing device.

A disc 35 fixed to the gear 33 and rotating therewith, carries two weighted arms 36 and 37 arranged side by side, each of which arms is pivoted at one end to the disc 35, as at 350. A spring 38 connects the free ends of the arms 36 and 37 to normally hold them in retracted positions. The disc 35 and the weighted arms 36 and 37 rotate within a shell 39. Two screw studs 40 and 41 (Fig. 3) project through concentric slots 390 in the shell 39 to hold the shell on the frame 31 in such a manner that it can be rocked slightly clockwise from the position in which it is shown in Figure 3. A link 42 connects the shell 39 to a lateral extension on an arm 43 of a control switch, pivoted at 44 (Fig. 1) on the frame 31. A block of insulation 45 fast on the arm 43, is adapted to contact with and raise a spring switch contact 46 to interrupt the supply of energy to the motor. A spring 47 normally holds the arm 43 in its idle position.

As the shaft 32, rotating in a clockwise direction, (Fig. 3), attains a given speed, centrifugal force overcomes the tension of the spring 38 and the inertia of the weighted arms 36 and 37, causing these arms to swing outwardly away from the shaft 32, to press shoes 50 and 51 on the arms 36 and 37, respectively, against the inner wall 49 of the flange of the shell 39, which, due to such friction of engagement, is rocked slightly clockwise on the screw studs 40 and 41, against the tension of the restoring spring 47.

The partial clockwise rotation of the shell 39 raises the link 42 and rocks the arm 43 (Fig. 1) counterclockwise to force the block of insulation 45 against the free end of the spring switch contact 46 to raise the contact 46 and open the electric circuit, whereupon the speed of the motor, said motor being no longer supplied with energy, will immediately diminish.

Reduction of the speed of the motor reduces the centrifugal force operating the arms 36 and 37 to a point where the spring 38 (Fig. 3) overcomes or reduces the friction of the shoes 50 and 51 on wall 49 of the shell 39 and retracts the arms 36 and 37. When the friction is sufficiently reduced, the spring 47 lowers the link 42 and restores the shell 39 to the position shown in Fig. 3. At the same time the spring 47 rocks the arm 43 clockwise (Fig. 1) and lowers the block of insulation 45 to permit the spring switch contact 46 to close the circuit and again supply the motor with electrical energy.

A feature of this invention consists of so arranging the disc 35, and arms 36 and 37, in relation to the inner wall 49 of the shell 39, so that, the shoes 50 and 51 will contact the inner wall 49 of the shell, even though the armature shaft moves to the extreme extent of its end play, in either direction. The arms 36 and 37 shift with the shaft, and the shell is stationary in relation to the axial shifting of the armature shaft, but the wall 49, which is the friction surface of the friction shell, is made wide enough to remain in operative relation with the shoes in any position of the armature shaft. Thus the end play of the armature shaft 32 has no effect on the operation of the speed control device.

Means is provided for adjusting the tension of the spring 47. If the tension of this spring is increased, a greater degree of friction between the shoes 50 and 51 on the arms 36 and 37 and the shell 39 will be required to overcome the tension of this spring and break the electric circuit. Also, the spring 47, with increased tension, will more quickly overcome the friction of the shoes 50 and 51 and the shell 39, and restore the shell to its normal position, thereby causing the electrical circuit to be closed earlier, which will permit the armature shaft 32 to rotate at a higher speed. If, however, the tension of the spring 47 is reduced, less friction between the shoes 50 and 51 and the shell 39 will be required to rotate the shell 39 to open the circuit. Also, the speed of the armature shaft 32 must be reduced to a greater extent before the spring 47 will overcome the friction of the shoes and lower the switch arm 43 to permit the spring contact arm 46 to re-establish the electric circuit, which will result in a lowered speed limit for the shaft 32.

The tension of the spring 47 is adjusted by merely shifting an elongated spring clip 53 to which the spring is attached at its lower end (Fig. 1). The spring clip 53 is secured in its adjusted position by a screw 54.

Figure 2:
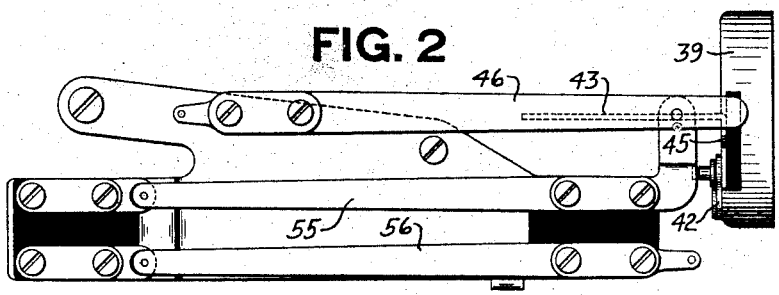
Fig. 2 is a top plan view of the switch, together with the automatic speed governing device.

The spring contact arms 55 and 56 (Fig. 2) form a part of a convenient form of switch which is closed automatically when the machine is released for operation. This switch remains closed throughout the operation of the machine and is opened again when the machine is brought to rest at the end of an operation.

In actual operation, as long as any one of the previously enumerated causes of excessive speed is present, the switch contact 46 rapidly opens and closes to interrupt and to re-establish the electric current. In effect, while the speed governor is functioning, the spring switch contact 46 vibrates quite rapidly as the shell 39 is actuated by the frictional action of the shoes 50 and 51 thereon, and is restored by the spring 47.

The net result of the vibratory opening and closing of the electric current, is to apply an intermittent or pulsating current to the windings of the motor, thereby maintaining the rotation of the armature shaft at a substantially constant speed. The shaft will, however, have a slight acceleration and retardation due to the pulsating current applied to the motor while the speed governor is functioning.

Figure 4:
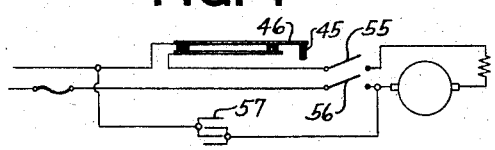
Fig. 4 is a conventional wiring diagram for an electric motor, including the control switch, and condenser.

A condenser 57 (Fig. 4) is provided in the switch circuit to reduce the liability of sparking when the switch points are disconnected, with the consequent burning and injury incident thereto, the condenser in this particular illustration being arranged so that the leads from the single condenser include both switches.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a speed governor, the combination with a rotatable shaft; means to drive the shaft; and means to control the supply of power to the driving means; of a rotatable member; means operable by the member to actuate the controlling means to cut off the supply of power; centrifugally operated devices driven by the shaft; and friction shoes directly on the devices to operate the rotatable member.

2. In a speed governor, the combination with a rotatable shaft having end play; means to drive the shaft; and means to control the supply of power to the driving means; of a rotatable member; means operable by the member to actuate the controlling means to cut off the supply of power; centrifugally operated devices on the shaft; friction shoes directly on the devices to operate the rotatable member in one direction; said member having a friction surface of a width to permit the friction shoes to co-operate with said friction surface in any position to which the devices are moved due to the end play of the shaft; and means to operate the rotatable member in the opposite direction to restore the actuating means for the controlling means to again turn on the supply of power.

3. In a speed governor, the combination with a driven member; means to drive the member; and means to cut off the supply of power to the driving means; of an element shiftable in opposite directions to actuate the controlling means; centrifugally operated means operable by the driven member to actuate the siftable element in one direction; friction shoes directly on the centrifugally operated means to connect the driven member with the shiftable element to shift said element; and means to restore the element to its original position.

4. In a speed governor, the combination of a rotatable shaft having end play; means to control the supply of energy to operate the shaft; a shiftable friction shell to actuate the controlling means; said shell having a friction surface therewithin; centrifugally operated arms rotatable with the shaft; and friction shoes on said arms adapted to contact the friction surface in any position the arms assume, due to the end play of the shaft, to shift the shell to cut off the supply of energy when said shaft exceeds a certain speed.

5. In a speed governor, the combination of a rotatable shaft having end play; means to drive the shaft; means to control the supply of energy to said driving means; a friction shell; said shell having a friction surface thereon; a connection between said shell and the controlling means; centrifugally operable arms rotatable and shiftable axially with the shaft; friction shoes on the arms adapted to contact the friction surface in any position the arms assume, due to the axial shifting thereof, to rock the shell to actuate the controlling means to interrupt the supply of energy to the driving means when said shaft exceeds a certain speed; a spring to restore the friction shell and controlling means to normal positions to re-establish the supply of energy when the speed of the shaft falls below a predetermined point; and means to vary the tension of said spring to determine the speed at which the centrifugally operated arms shall become effective to rock the shell.

6. In a speed governor for electric motors; a motor having a shaft having end play to permit the shaft to find its electrical center; a normally closed switch to control the supply of electrical current to said motor; a friction shell; an arm operable by the shell to open said switch; centrifugally operated arms rotatabe with the shaft and adapted to contact with and rock said friction shell, when the arms assume any position due to the end play of the shaft, to open the switch when the rotation of said shaft exceeds the predetermined speed; and means to predetermine the speed at which the shell shall be actuated.

7. In a speed governor for electric motors; the combination of a driving shaft having end play to permit the shaft to find its electrical center; a normally closed switch; a friction shell; means operable by the friction shell to actuate the switch; and centrifugal means operated by the shaft when said shaft exceeds a certain speed of rotation to rock the shell and actuate the switch to open the same, said centrifugal means adapted to shift with the shaft when it moves to find its electrical center, the shell being of sufficient width to always remain in co-operating relation during the end play movement of the shaft.

8. In a speed governor for electric motors, the combination of a driving shaft having end play to permit the shaft to move to find its electrical center; a normally closed switch; an arm to open said switch; a friction shell shiftable to operate said arm; centrifugal means to frictionally engage and shift the shell when the speed of the shaft exceeds a certain index, said shell being of sufficient width to permit the centrifugal means to contact the shell when the shaft moves to any position during its end play movement; a spring, the tension of which determines the speed at which the switch shall be operated; and means to adjust the tension of said spring.

9. In a speed governor for electric motors, the combination of a rotatable shaft adapted to adjust itself longitudinally to find its electrical center; means to drive the shaft; a supply line of power to the driving means; a switch in the supply line; a flanged rotatable member; means carried by the shaft to frictionally engage the flanged member, in any of its various longitudinal positions, to frictionally drive the member in one direction to open the switch; and a spring to drive said member in another direction to close the switch, the opening and closing of the switch applying an intermittent current to the drive means to maintain the shaft at a substantially constant speed of rotation when said shaft is in any of its various longitudinal positions of adjustment.

In testimony whereof I affix my signature.

ELMER C. CARTER.